US012332121B2

(12) United States Patent
Hofer et al.

(10) Patent No.: US 12,332,121 B2
(45) Date of Patent: Jun. 17, 2025

(54) SEMI-IRREVERSIBLE TEMPERATURE EXPOSURE SENSOR CUSTOMIZABLE BY THERMAL PRINTER

(71) Applicant: Temptime Corporation, Morris Plains, NJ (US)

(72) Inventors: Gene A. Hofer, Lake Zurich, IL (US); Mohannad Abdo, Clifton, NJ (US); Marielle K. Smith, Parlin, NJ (US); Arianna E. Harding, Cary, IL (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 760 days.

(21) Appl. No.: 17/498,371

(22) Filed: Oct. 11, 2021

(65) Prior Publication Data
US 2023/0114227 A1    Apr. 13, 2023

(51) Int. Cl.
*G01K 11/12* (2021.01)
*B41J 2/375* (2006.01)
*C09D 11/50* (2014.01)
*G01K 3/04* (2006.01)
*G01K 11/16* (2021.01)
(Continued)

(52) U.S. Cl.
CPC ............... *G01K 11/12* (2013.01); *B41J 2/375* (2013.01); *C09D 11/50* (2013.01); *G01K 3/04* (2013.01); *G01K 11/16* (2013.01); *C09D 5/26* (2013.01); *G09F 2003/0211* (2013.01)

(58) Field of Classification Search
CPC .......... G01K 11/12; G01K 3/04; G01K 11/16; B41J 2/375; C09D 11/50; C09D 5/26; G09F 2003/0211
See application file for complete search history.

(56) References Cited

U.S. PATENT DOCUMENTS 4,929,091 A * 5/1990 Kostic ................... G01K 11/16
374/162
7,712,431 B2 * 5/2010 Roche ..................... G01K 1/14
374/106
(Continued)

OTHER PUBLICATIONS

International Search Report dated Jan. 24, 2023 issued for International PCT Application No. PCT/US22/45855.

*Primary Examiner* — Nathaniel T Woodward
*Assistant Examiner* — Philip L Cotey
(74) *Attorney, Agent, or Firm* — K&L Gates LLP

(57) ABSTRACT

A customizable temperature exposure indicator and methods for making the same are disclosed. The temperature exposure indicator includes a substrate, a printing region of the substrate forming a heat sensitive media that is configured to darken when it is heated by a thermal printhead, the darkening being permanent with respect to subsequent cooling of the media; at least one memory thermochromic composition provided on an indicator region of the substrate, the thermochromic composition is configured to have high temperature color state when it is heated above a high temperature threshold, and to remain in the high temperature color state until it is cooled below a low temperature threshold, the thermochromic composition is configured to have a low temperature color state when it is cooled below the low temperature threshold and to maintain the low temperature threshold until it is heated above the high temperature threshold.

32 Claims, 7 Drawing Sheets

(51) Int. Cl.
*C09D 5/26* (2006.01)
*G09F 3/02* (2006.01)

(56) References Cited

U.S. PATENT DOCUMENTS

| | | | | |
|---|---|---|---|---|
| 8,569,208 B1* | 10/2013 | Ribi | ............... | G01N 31/222 |
| | | | | 503/201 |
| 9,217,736 B2* | 12/2015 | Ribi | ............... | G01N 31/229 |
| 9,709,539 B2* | 7/2017 | Ribi | ............... | G01N 21/78 |
| 10,113,920 B2* | 10/2018 | Edson | ............... | G01K 11/12 |
| 10,168,307 B1* | 1/2019 | Ribi | ............... | G01N 31/229 |
| 11,225,100 B2* | 1/2022 | Ribi | ............... | G01N 31/229 |
| 2007/0207280 A1* | 9/2007 | Wolfe | ............... | G09F 9/30 |
| | | | | 428/34.1 |
| 2010/0012018 A1* | 1/2010 | Ribi | ............... | G01K 3/04 |
| | | | | 252/182.13 |
| 2011/0248224 A1* | 10/2011 | Lucht | ............... | G01K 11/16 |
| | | | | 252/583 |
| 2012/0149561 A1* | 6/2012 | Ribi | ............... | B41M 3/005 |
| | | | | 428/32.52 |
| 2012/0154349 A1* | 6/2012 | Daniel | ............... | H02N 2/181 |
| | | | | 345/205 |
| 2012/0162339 A1* | 6/2012 | Ishii | ............... | B41J 2/32 |
| | | | | 347/172 |
| 2015/0047552 A1* | 2/2015 | Ortais | ............... | C09D 5/26 |
| | | | | 116/216 |
| 2017/0363479 A1* | 12/2017 | Harvey | ............... | G01K 11/12 |
| 2019/0300740 A1* | 10/2019 | Aida | ............... | C09D 11/328 |
| 2019/0346415 A1* | 11/2019 | Abdo | ............... | G01K 3/04 |
| 2019/0383649 A1* | 12/2019 | Abdo | ............... | B41M 5/40 |
| 2020/0048542 A1* | 2/2020 | Umemoto | ............... | C09D 11/037 |
| 2020/0370966 A1* | 11/2020 | Nemet | ............... | G01K 7/22 |
| 2021/0034831 A1* | 2/2021 | Abdo | ............... | G06K 19/06056 |
| 2022/0112391 A1* | 4/2022 | Smith | ............... | B41M 5/382 |
| 2022/0318583 A1* | 10/2022 | Nudel | ............... | G06K 19/06028 |
| 2022/0412933 A1* | 12/2022 | Millman | ............... | G01K 3/04 |

* cited by examiner

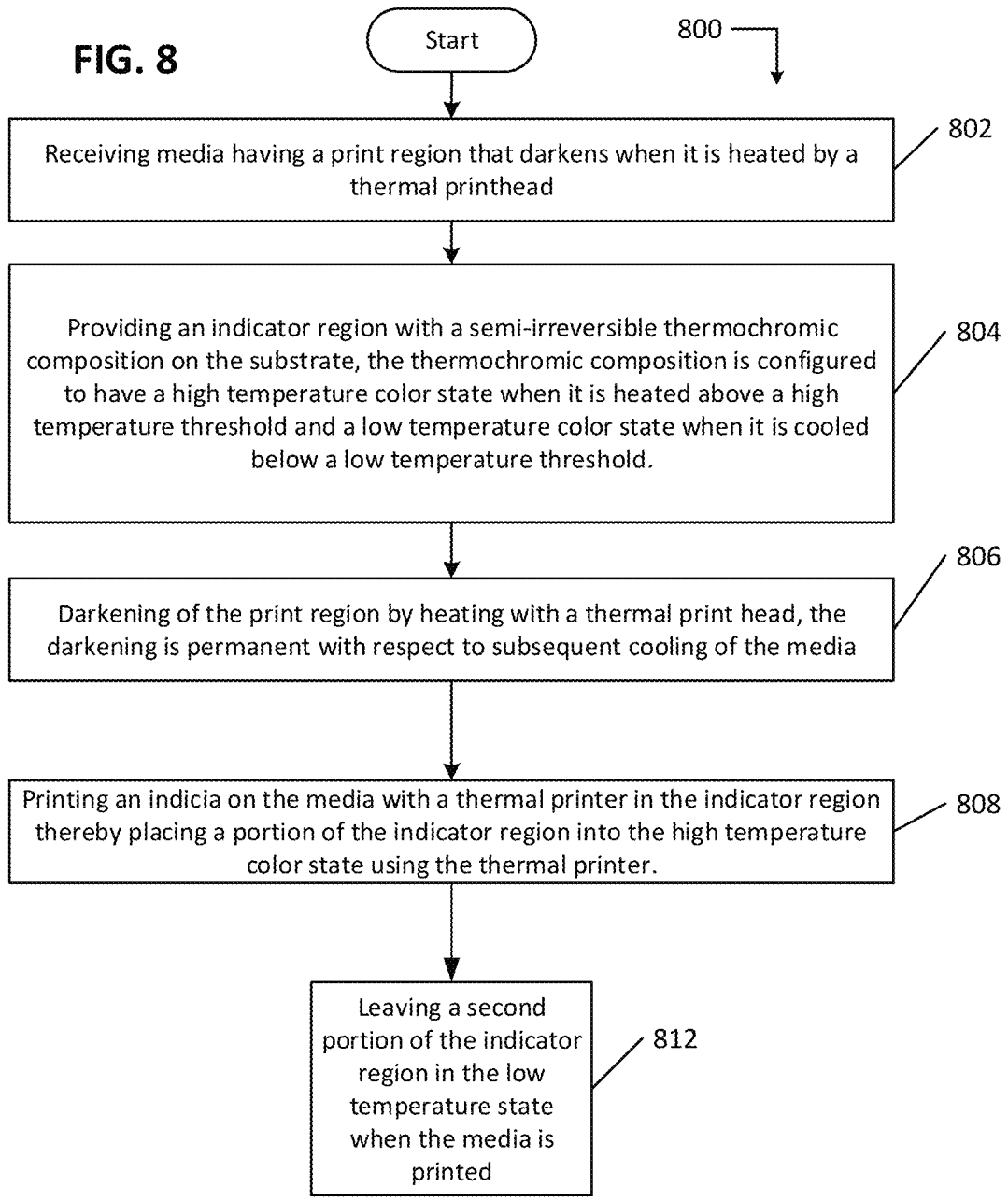

SEMI-IRREVERSIBLE TEMPERATURE EXPOSURE SENSOR CUSTOMIZABLE BY THERMAL PRINTER

BACKGROUND

Many types of products are perishable under different environmental conditions. For example products may be degraded or rendered unsafe or otherwise unusable by too much heat exposure cumulatively over time or peak heat exposure over a threshold that rapidly causes product deterioration, such as denaturing the proteins of a biologic product or thawing of a frozen product. Other products may be negatively impacted by being too cold, e.g., by freezing or other undesirable physical changed caused by too low a temperature. Many types of indicators are used to show historical exposure to environmental conditions, e.g., to low or too high a temperature, often in a visible manner, such as by change of color of an indicator material.

Certain types of thermochromic materials. Often referred to as memory thermochromic materials, exhibit semi-irreversible color changes in response to changing temperature. These materials exhibit a color changing hysteresis effect, changing to a high temperature color state when heated above a high temperature threshold, with the color state being maintained when the material returns to a temperature below that threshold. The material then changes to a low temperature color state only when the temperature reduces sufficiently far below a low temperature threshold. The material then remains in the low temperature color state until the material returns to a temperature above the high temperature threshold. For example the material may be light colored in the low temperature state and dark colored in the high temperature state, or vice versa, or the material may be transparent or invisible in the high temperature state, and colored or visible in the low temperature state, or vice versa.

As historical environmental exposure indicators and other types of temperature indicators gain broader use, it is desirable to allow them to be added to product labels or packaging (or customized if already present) at the time the labels and packaging are manufactured, or even at the point where a host product or its container is labeled.

A common approach to producing custom labels for packages is the use of direct thermal printers, for example, the Zebra ZT600, the Zebra ZT400, the Zebra ZD600, the Zebra ZD400 series printers, available from Zebra Technologies Corp or any other thermal printer may be used. The present disclosure describes semi-irreversible temperature exposure sensors that may be customized with such printers, as well as related method of manufacture and customization.

SUMMARY

Disclosed herein are customizable temperature exposure indicators and methods for making the same are disclosed. The temperature exposure indicator includes a substrate, a printing region of the substrate forming a heat sensitive media that is configured to darken when it is heated by a thermal printhead, the darkening being permanent with respect to subsequent cooling of the media; at least one memory thermochromic composition provided on an indicator region of the substrate, the thermochromic composition is configured to have high temperature color state when it is heated above a high temperature threshold, and to remain in the high temperature color state until it is cooled below a low temperature threshold, the thermochromic composition is configured to have a low temperature color state when it is cooled below the low temperature threshold and to maintain the low temperature threshold until it is heated above the high temperature threshold.

Aspects of the subject matter described herein may be useful alone or in combination with one or more other aspects described herein. In an aspect of the present disclosure, a temperature exposure indicator includes a substrate, a printing region of the substrate forming a heat sensitive media that is configured to darken when it is heated by a thermal printhead, the darkening being permanent with respect to subsequent cooling of the media.

In another aspect of the present disclosure, which may be used in combination with any other aspect or combination of aspects listed herein, at least one memory thermochromic composition provided on an indicator region of the substrate.

In another aspect of the present disclosure, which may be used in combination with any other aspect or combination of aspects listed herein, the thermochromic composition is configured to have high temperature color state when it is heated above a high temperature threshold, and to remain in the high temperature color state until it is cooled below a low temperature threshold.

In another aspect of the present disclosure, which may be used in combination with any other aspect or combination of aspects listed herein, the thermochromic composition is configured to have a low temperature color state when it is cooled below the low temperature threshold and to maintain the low temperature threshold until it is heated above the high temperature threshold.

In another aspect of the present disclosure, which may be used in combination with any other aspect or combination of aspects listed herein, the darkened portion of the media maintains its dark appearance below the low temperature threshold.

In another aspect of the present disclosure, which may be used in combination with any other aspect or combination of aspects listed herein, a portion of the indicator region is exposed to the high temperature threshold using a thermal print head, while a remaining portion of the thermochromic composition is left in the low color temperature state, thereby providing a human readable indicia within the indicator region.

In another aspect of the present disclosure, which may be used in combination with any other aspect or combination of aspects listed herein, the high temperature state of the thermochromic composition is invisible to the human eye, while the low temperature state is visible or the high temperature state of the thermochromic composition is visible to the human eye, while the low temperature state is invisible.

In another aspect of the present disclosure, which may be used in combination with any other aspect or combination of aspects listed herein, the visual characteristics of the memory thermochromic composition in the high temperature color state may vary based on hysteresis of the composition.

In another aspect of the present disclosure, which may be used in combination with any other aspect or combination of aspects listed herein, the visual characteristics of the memory thermochromic composition in the low temperature color state may vary based on hysteresis of the composition.

In another aspect of the present disclosure, which may be used in combination with any other aspect or combination of aspects listed herein, a portion of the indicator region is exposed to the low temperature threshold using a cooling agent, while a remaining portion of the thermochromic composition is left in the high color temperature state, thereby providing a human readable indicia within the indicator region.

In another aspect of the present disclosure, which may be used in combination with any other aspect or combination of aspects listed herein, the high temperature state of the thermochromic composition is invisible to the human eye, while the low temperature state is visible or the high temperature state of the thermochromic composition is visible to the human eye, while the low temperature state is invisible.

In another aspect of the present disclosure, which may be used in combination with any other aspect or combination of aspects listed herein, the indicator region and the printing region are non-overlapping.

In another aspect of the present disclosure, which may be used in combination with any other aspect or combination of aspects listed herein, the indicator region and the printing region are overlapping.

In another aspect of the present disclosure, which may be used in combination with any other aspect or combination of aspects listed herein, the printing region occupies the entire surface of the substrate.

In another aspect of the present disclosure, which may be used in combination with any other aspect or combination of aspects listed herein, the high temperature threshold temperature is in a range from about 5° C. to about 100° C., from about 20° C. to about 80° C., from about 30° C. to about 70° C., from about 40° C. to about 60°

In another aspect of the present disclosure, which may be used in combination with any other aspect or combination of aspects listed herein, the low temperature threshold temperature is in a range from about −30° C. to about 20° C., from about −15° C. to about 10° C., from about −5° C. to about 5° C., from about 0° C. to about 15° C.

In another aspect of the present disclosure, which may be used in combination with any other aspect or combination of aspects listed herein, the thermochromic composition comprises at least one of (i) leuco dye (ii) liquid crystal; (iii) wax; (iv) micro-encapsulated dye; (v) an ester; (vi) an alkane; (vii) an organic polymer; (viii) an inorganic material.

In another aspect of the present disclosure, which may be used in combination with any other aspect or combination of aspects listed herein, the substrate further comprises at least of one (i) paper; (ii) polyester; (iii) nylon; (iv) vinyl; (v) other synthetic polymer.

In another aspect of the present disclosure, which may be used in combination with any other aspect or combination of aspects listed herein, the thermochromic composition is configured to provide multiple color states, visible to the human eye when the temperature exposure indicator is exposed to a range of threshold.

In another aspect of the present disclosure, which may be used in combination with any other aspect or combination of aspects listed herein, multiple thermochromic compositions are provided on the substrate, each composition having a respective low temperature threshold and respective low temperature color state, or each composition have a respective high temperature threshold and a respective high temperature color state.

In another aspect of the present disclosure, which may be used in combination with any other aspect or combination of aspects listed herein, the indicator region overlays at least a portion of a bar code symbol that is readable by an optical scanning device, wherein the visual indication provided by the thermochromic composition affects the appearance of the bar code, and wherein the changed appearance of the indicator region provides a different signal to the optical scanning device.

In another aspect of the present disclosure, which may be used in combination with any other aspect or combination of aspects listed herein, the bar code symbol is printed and the indicator is placed in the high temperature state with the same printing operation.

In another aspect of the present disclosure, which may be used in combination with any other aspect or combination of aspects listed herein, the substrate includes printed information identifying the indicator region.

In another aspect of the present disclosure, which may be used in combination with any other aspect or combination of aspects listed herein, a method of creating a descending temperature indicator includes receiving media having a print region that darkens when it is heated by a thermal printhead, the darkening being permanent with respect to subsequent cooling of the media, the media also having an indicator region with a memory thermochromic composition provided on the substrate, the thermochromic composition configured to have a high temperature color state when it is heated above a high temperature threshold, and to remain in the high temperature color state until it is cooled below a low temperature threshold, and a low temperature color state when it is cooled below a low temperature threshold and to maintain the low temperature threshold until it is heated above the high temperature threshold, wherein the substrate is provided with the thermochromic composition in the low temperature color state.

In another aspect of the present disclosure, which may be used in combination with any other aspect or combination of aspects listed herein, printing indicia on the media with a thermal printer in the print region.

In another aspect of the present disclosure, which may be used in combination with any other aspect or combination of aspects listed herein, placing a portion of the indicator region into the high temperature color state using the thermal printer.

In another aspect of the present disclosure, which may be used in combination with any other aspect or combination of aspects listed herein, leaving a second portion of the indicator region in the low temperature color state when the media is printed, so that the combination of the first and second portion of the thermochromic composition forms a human readable indicia indicating the indicator has not been exposed to a temperature below the low temperature threshold.

In another aspect of the present disclosure, which may be used in combination with any other aspect or combination of aspects listed herein, the indicia changes or disappears when the indicator is exposed to a temperature below the low temperature threshold, and is configured to indicate that the indicator has been exposed to a temperature below the low temperature threshold.

In another aspect of the present disclosure, which may be used in combination with any other aspect or combination of aspects listed herein, the high temperature threshold temperature is in a range from about 5° C. to about 100° C., from about 20° C. to about 80° C., from about 30° C. to about 70° C., from about 40° C. to about 60° C.

In another aspect of the present disclosure, which may be used in combination with any other aspect or combination of aspects listed herein, the low temperature threshold temperature is in a range from about −30° C. to about 20° C., from about −15° C. to about 10° C., from about −5° C. to about 5° C., from about 0° C. to about 20° C.

In another aspect of the present disclosure, which may be used in combination with any other aspect or combination of aspects listed herein, at least a portion of the indicator region is heated above the high temperature threshold thereby placing the indicator region in the high temperature state and contemporaneously applying, the thermochromic composition to the thermochromic material region with the substrate being passed through a thermal printer.

In another aspect of the present disclosure, which may be used in combination with any other aspect or combination of aspects listed herein, a method of creating an ascending temperature indicator includes receiving media having a print region that darkens when it is heated by a thermal printhead, the darkening being permanent with respect to subsequent cooling of the media, the media also having an indicator region with a memory thermochromic composition provided on the substrate, the thermochromic composition configured to have a low temperature color state when it is cooled below a low temperature threshold, and to remain in the low temperature color state until it is heated above a high temperature threshold, and a high temperature color state when it is heated above a high temperature threshold and to maintain the low temperature threshold until it is cooled below the low temperature threshold, wherein the substrate is provided with the thermochromic composition in the high temperature color state.

In another aspect of the present disclosure, which may be used in combination with any other aspect or combination of aspects listed herein, printing indicia on the media with a thermal printer in the print region.

In another aspect of the present disclosure, which may be used in combination with any other aspect or combination of aspects listed herein, placing a portion of the indicator region into the low temperature color state using a cooling agent to form a human readable indicia in the indicator region.

In another aspect of the present disclosure, which may be used in combination with any other aspect or combination of aspects listed herein, leaving a second portion of the indicator region in the high temperature color state when the media is cooled, so that the combination of the first and second portion of the thermochromic composition forms a human readable indicia indicating the indicator has not been exposed to a temperature above the high temperature threshold.

In another aspect of the present disclosure, which may be used in combination with any other aspect or combination of aspects listed herein, the indicia changes or disappears when the indicator is exposed to a temperature above the high temperature threshold, and is configured to indicate that the indicator has been exposed to a temperature above the high temperature threshold.

In another aspect of the present disclosure, which may be used in combination with any other aspect or combination of aspects listed herein, the high temperature threshold temperature is in a range from about 5° C. to about 100° C., from about 20° C. to about 80° C., from about 30° C. to about 70° C., from about 40° C. to about 60° C.

In another aspect of the present disclosure, which may be used in combination with any other aspect or combination of aspects listed herein, the low temperature threshold temperature is in a range from about −30° C. to about 20° C., from about −15° C. to about 10° C., from about −5° C. to about 5° C., from about 0° C. to about 15° C.

In another aspect of the present disclosure, which may be used in combination with any other aspect or combination of aspects listed herein, the device is a printer.

These and other features are disclosed in greater detail in the accompanying figures and the Detailed Description below.

BRIEF DESCRIPTION OF THE FIGURES

Some example apparatus embodiments of the invention, and example procedures for making and using one or more example embodiments, are described in detail herein and by way of example, with reference to the accompanying drawings (which are not necessarily drawn to scale with regard to any internal or external structures shown) and in which like reference characters designate like elements throughout the several views, and in which:

FIG. 8 is a block diagram illustrating a method for creating an ascending or descending temperature indicator, according to an example of the present disclosure.

DETAILED DESCRIPTION OF EXAMPLE EMBODIMENTS

Figure 1:
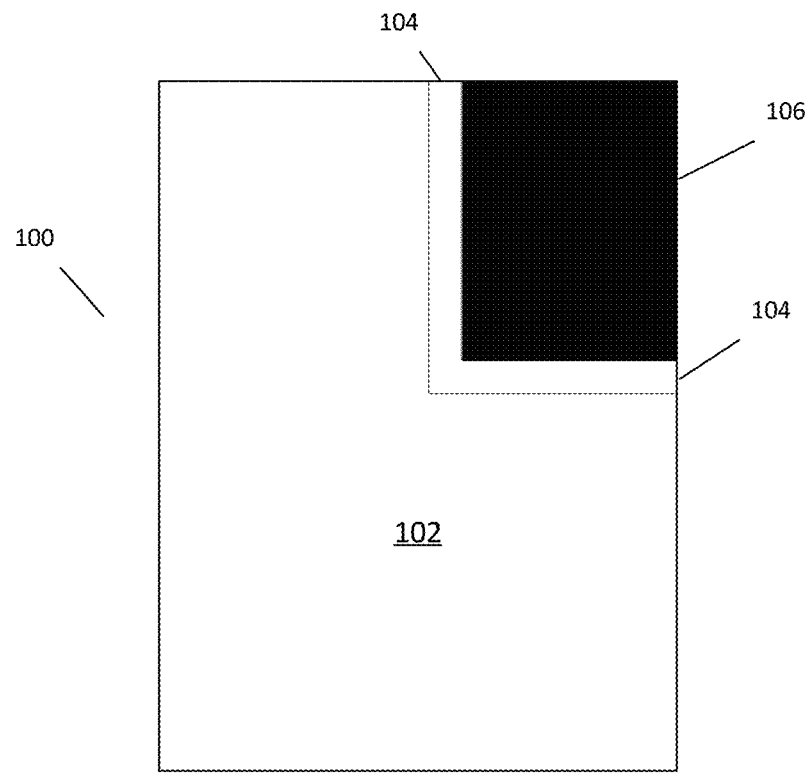
FIG. 1 illustrates a perspective view of a temperature exposure indicator prior to customization, according to an example of the present disclosure.

The present disclosure generally describes the use of semi-irreversible color changing materials to produce several types of customizable labels with historical temperature exposure indication, some of which are suitable for use with thermal printers. Direct thermal printers may be used to customize the color state and appearance of the label. In other examples, other approaches to label customization may also be employed, e.g., the use of a freeze spray may be used as part of the customization process. Some of these indicators may be particularly suited for the manufacture of custom labels which are printed and/or customized when a host product is manufactured or when it is packaged for distribution, or even at a later point in its life cycle or distribution chain.

Additionally, techniques for printing activatable environmental exposure indicators, such as temperature exposure indicators, with a thermal printer stock are disclosed.

A need exists for an activatable medium that is easily customized by product manufacturers or distributors, e.g., labeling product at the point of manufacture or shipment, as well as an indicator that is easy to interpret by a product end-user who receives a product having a label produced using the activatable medium. Some of the examples in the present disclosure provide efficient on-demand label activation, that may occur at the same time labels are printed and/or time stamped or recorded. The discloses approach may be employed with various types of environmental exposure indicators that can be stored in a wide range of environmental conditions and detect a wide range of environmental conditions.

As used herein, the term "low temperature threshold" means a temperature, usually a temperature below 0° C., that perishable products, such as a food or a vaccine are generally required to be maintained above, to avoid spoilage or maintain efficacy for extended periods. The threshold temperature may vary depending on the properties of the host product which is being monitored. A low temperature excursion is exposure of the product to temperatures below the low temperature threshold, possibly for a short time, or possibly for some minimum amount of time, e.g., long enough for the product or a product component to freeze or crystallize.

As used herein, the term "high temperature threshold" means a temperature, which when a perishable product is expose to a temperature above the threshold, that can cause damage or harm to the product, e.g., spoilage or reduced efficacy of the product. A high temperature excursion is exposure of the product to temperatures above the high temperature threshold, possibly for a short time, or possibly for some minimum amount of time. The high temperature threshold may vary depending on the nature of the host product, and the degradation mechanism that is being monitored. For example, the mechanism of concern may include thawing (temperatures above a threshold of about 0° C., although varying with the nature of the host product and/or the melting point of one of its components), failing to maintain proper refrigeration (temperatures above a threshold in the range of about 6° C.-15° C., depending on the product and/or refrigeration/storage protocol, or the product being allowed to overwarm in hot ambient conditions (temperatures thresholds from about 35° C. to about 60° C. In some cases the high temperature threshold may higher than normal ambient conditions, e.g., around 100 degrees C., or even higher.

As used herein, the term "thermal print head" refers to a component of a thermal printer device that transfers heat and, optionally, applies pressure to a thermal print medium in response to an instruction from a controller, operatively connected to a thermal printer.

As used herein, the term "thermochromic composition" refers to a composition or combination of compositions that possess the property of changing color state in response to a change in temperature.

As used herein, the term "cooling agent" is a substance or apparatus, e.g., refrigerant used as a treatment, e.g., the exposure to certain amount of refrigerant that absorbs heat, such that the thermochromic composition in the indicator region of the substrate is exposed to a temperature below the low temperature threshold thereby placing the indicator region in a low temperature color state.

As used herein, the term "color state" refers to an observable color including a change in hue, darkness, color intensity, opacity, fluorescence or phosphorecense, or other observable optical properties of the indicator material. The change in color state may be detectable by the unaided human eye, or may occur in a manner that requires machine detection, e.g., at wavelengths not visible to the unaided human eye.

As used herein, the term "permanent" refers to a color state that is stable and intended to remain substantially unchanged with respect to subsequent cooling and/or heating of the media. However, subsequent changes in the permanent color state, such as fading, due to conditions irrespective of temperature-responsive hysteresis properties of the composition, may occur. To the extent the visual appearance of the permanent color state changes over time, not necessarily dependent on temperature, there is an assumption this will not occur within the intended life of the device Descending Indicators In the present disclosure, exemplified descending temperature indicators include indicators that can be used to determine if a perishable product has been exposed to and/or maintained at temperature below an acceptable temperature or range of temperatures.

To signal past exposure to a temperature below a predetermined threshold, indicators according to the present disclosure usefully can have one observable appearance while the indicator is maintained at an acceptable range of temperatures above a low temperature threshold, and a different observable appearance after the indicator has been exposed to a temperature below the low temperature threshold. This observable change may include having an indicia appear that indicates the indicator has had a low temperature excursion, having an indicia indicating the indicator has not been exposed to such a low temperature disappear, or a change in color or other appearance of an indicia. This observable change can be provided by a thermochromic composition that changes color states in response to temperature exposure below the low temperature threshold.

Ascending Indicators

In the present disclosure, exemplified ascending temperatures include threshold temperature indicators that can be used to determine if a perishable product has been maintained at an acceptable temperature range or has been exposed to temperature excursion above a high temperature threshold.

To signal past exposure to a temperature above a predetermined threshold, indicators according to the present disclosure usefully can have one observable appearance before exposure to a temperature at or above the threshold and a different observable appearance after exposure of the indicator. This observable change can be provided by the disappearance of an underlying thermochromic composition or indicia that was observable before the indicator was exposed to temperatures at or above the threshold temperature, the appearance of a warning or other indication that the temperature exposure has occurred, or a change in color or in the appearance of an indicia.

Indicator Materials

In the present disclosure, indicators for historical temperature exposure may be provided using semi-irreversible thermochromic compositions or memory thermochromics. The memory thermochromic composition selected may be exhibit hysteresis—the phenomenon in which the value of a physical property lags behind changes in the effect causing it—between the low temperature color state and the high temperature color state of this system, e.g., color density, although it will be appreciated that any color state change that is detectable may be employed. These compositions are called memory thermochromics given they exhibit a large hysteresis curve.

When the indicator material is placed in a state above a high temperature threshold, it enters a high temperature color state, e.g., becoming light. It then remains light as the temperature is lowered below the threshold, until a low temperature threshold is approached. At this time the material transitions to a low temperature color state, e.g., becoming dark. (It will be appreciated that other color state transitions may also be possible, depending on the material.) It then remains in the low temperature color state, e.g., dark, as the material is heated above the low temperature threshold, until it begins to approach the high temperature threshold. The potential hysteresis of the memory thermochromic composition may be advantageously exploited in condition change indicators, such as ascending and descending indicators. Furthermore, given the potential hysteresis, remaining in a particular color state does not mean necessarily staying exactly the same color given a potential for variability in color density. The hysteresis is what advantageously provides the desired "memory" or "irreversibility" functionality. However, the color change from light to dark or dark to light is not abrupt but rather either ranged or cumulative in nature which is what advantageously provides the potential for either cumulative or thermometer like functionality.

In the present disclosure, the memory thermochromic composition may be one of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the thermochromic composition may be one of leuco dye, a micro-encapsulated leucodye, microencapsulated leuco pigments (basic components of thermochromic microcapsules include dye, developer, and solvent), an SCC Polymer, a water-based SCC polymer emulsion, liquid crystal, inorganic materials, a diacetylene, an alkane, a wax, an ester or combinations thereof.

In an embodiment, the memory thermochromic composition may be one of polyoxymethylenemelamine, maleate polymer, ODB-II, Green DCF, Behenic acid methylester, resin, color modifier, bisphenol A derivative, leuco dye, and UV absorber. In an embodiment, the memory compositions may also be available in pigment powder form, water-based ink or slurry matrixes. For example, a water based slurry having the components: melamine formaldehyde resin, 3-diethylamino-6-methyl-7,2,4-xylidinofluoran, water, and aromatic ester may be used.

Activation—Generally

A conventional printing technology for printing dataforms or images, such as barcode symbols, is direct thermal printing. A direct thermal printer does not use a ribbon, but instead the printable media itself is the thermal media. The direct thermal media, includes a web of material, e.g., paper, polymers, or the like, which is impregnated or coated with a thermochromic material that changes color when exposed to sufficient heat. A common thermochromic material for such applications is a leuco dye. The media may be impregnated with a solid-state mixture of a dye and a suitable matrix, for example, a fluoran leuco dye and an octadecylphosphonic acid. When the matrix is heated above its melting point, the dye reacts with the acid, shifts to its colored form, and the changed form is then conserved in metastable state when the matrix solidifies back quickly enough. This process is usually monochrome, but some two-color designs exist, which can print both black and an additional color (often red) by applying heat at two different temperatures.

In the printing process, selected portions of the media switches from a first chemical form that is colorless to a second chemical form that is black or colored. The web of direct thermal media is pressed against and moved past the thermal print head. The thermal print head receives data of a rendered bitmap and heats specific heating elements within the row of addressable heaters according to the data To print labels or other documents, thermal printers may use a thermal print head comprising a row of addressable heating elements to heat a thermal media. The elements are small compared to the image to be printed; e.g., 8, 12, or 24 elements per mm are typical, and other resolutions, are commercially available. This differs from thermal inkjet printers which use addressable heaters to heat an ink or wax that is dropped or ejected to a document or other printable media.

Heat from the heated elements causes the heat sensitive media on the printing region of the substrate to transition from colorless to colored. Additionally, the heat from the heated elements may cause the thermochromic indicator compositions on the indicator regions of the substrate to transition from low temperature color state to a high temperature color state. Additionally, if different inks are applied having different response temperatures, this may allow for selective imaging of specific print regions Print head heating elements which are not heated generally do not cause a color transition. In some direct thermal media, a first zone of the media includes thermochromic material that transitions from a first color to colorless while a second zone of the printable media includes thermochromic material that transitions from a second different color to colorless.

FIG. 1 illustrates a perspective view of the temperature exposure indicator prior to activation, according to an example of the present disclosure. Optionally, the medium may contain conventional elements of a thermal print media, e.g., by adding semi-irreversible indicator components to a conventional thermal print media, in FIG. 1 in the upper right hand corner. In the example, the indicator is only applied in the corner, so that the print medium can still be printed using a conventional thermal printing process, either across the whole medium, or as shown in FIG. 1, in the portion of the media outside the upper right hand corner. Optionally, the medium may have a predetermined pattern, with conventional thermal print media structure in some predetermined locations, and with activatable environmental indicators in other locations. Alternatively, the conventional print media elements and environmental indicators may, in some cases overlap.

Referring to FIG. 1 indicator 100a may include a substrate 102, a printing region 104 of the substrate forming a heat sensitive media that is configured to darken when it is heated by a thermal printhead, the darkening being permanent with respect to subsequent cooling of the media.

The substrate 102 of indicator 100 may also include an indicator region 106 where at least one memory thermochromic composition is provided on an indicator region 106 of the substrate 102. In an embodiment, the memory thermochromic composition may be applied using on the following techniques: screen printing, gravure, flexo printing, ink jet printing and/or thermal transfer.

Figure 2:
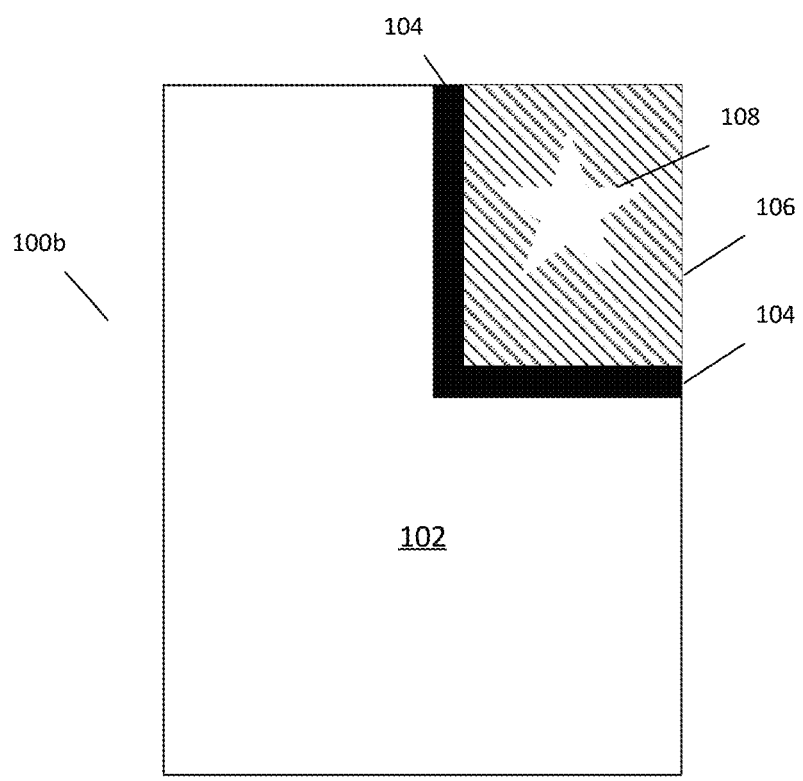
FIG. 2 illustrates a perspective view of the temperature exposure indicator of FIG. 1, post activation and where a portion of the indicator region is in the high temperature state, according to an example of the present disclosure.

In the illustrated example, the memory thermochromic composition may be visible to the human eye when it is first provided on an indicator region 106 of the substrate 102. It will be appreciated that the entire semi-irreversible indicator color-state change cycle might not be human visible, but rather may be entirely, or in part, proceed in a manner that is not visible to the naked human eye, e.g., color state changes in machine readable wavelengths, such as UV, that are not visible to the unaided human eye. In an embodiment, a portion of the thermochromic composition in the indicator region 106 is treated with heat from thermal print head and the treated portion becomes invisible, as illustrated in FIG. 2, indicia 108. Conversely, other portions of the thermochromic composition in indicator region 106 remain visible, as applied to the substrate 102 because it did not receive heat treatment. In an embodiment, the memory thermochromic composition located in the indicator region 106 is configured to transition to a high temperature color state when it is heated above a high temperature threshold, and to remain in the high temperature color state until it is cooled below a low temperature threshold. Additionally, the memory thermochromic composition located in the indicator region 106 is configured to take on a low temperature color state when it is cooled below the low temperature threshold and to maintain the low temperature threshold until it is heated above the high temperature threshold. When originally preparing the indicator, it may optionally be exposed to a temperature below the low temperature threshold of the indicator medium to insure it is in low temperature state; this may either be applied to the whole indicator region, or selectively to only a portion of the region, e.g., using a precise application of a freeze spray.

In an embodiment, the high temperature threshold temperature is in a range from about 5° C. to about 100° C., from about 20° C. to about 80° C., from about 30° C. to about 70° C., from about 40° C. to about 60° C.

In an embodiment, the low temperature threshold temperature is in a range from about −30° C. to about 20° C., from about −15° C. to about 10° C., from about −5° C. to about 5° C., from about 0° C. to about 20° C.

In an embodiment, the indicator region 106 (or a portion of the region) may be provided in the low temperature state, or may be cooled, e.g., using a refrigerant, to place it in the low temperature state. Subsequently, a portion of the indicator region 106 may then be exposed to the high temperature threshold, e.g., using a thermal print head of a thermal printer, while a remaining portion of the thermochromic composition is left in the low temperature color state. The portion of the indicator region that is treated in this manner may be selected to provide an indicia, e.g., a human and/or machine readable within the indicator region. In one example embodiment, in the high temperature state, the thermochromic composition may be invisible to the unaided human eye, while the low temperature state is visible. It will be appreciated that, depending on the application, it may also be desirable for the high temperature state of the thermochromic composition to be visible to the human eye, while the low temperature state is invisible, or to use two distinct color states, e.g., dark and light, or a change in hue, that makes it clear to an observer which state the indicator is in.

In some examples, the substrate 102 may be one of (i) paper; (ii) polyester; (iii) nylon; (iv) vinyl; (v) other synthetic polymers. In an additional embodiment, the substrate 102 may be porous materials such as papers & films (e.g., carbon fiber, Teslin synthetic paper, polyethylene ("PE"), polypropylene ("PP"), polytetrafluoroethylene ("PTFE"), polyester, polyethylene, polyolefin, polyimide, vinyl, acrylic film, polypropylene, non-woven nylon, coated and non-coated direct thermal paper, printable polyethylene terephthalate ("PET"), oriented polypropylene ("OPP"), biaxially oriented polypropylene ("BOPP"). In an additional embodiment, the substrate 102 may include printed information identifying the indicator region.

In some examples, the memory thermochromic composition applied to indicator region 106 is selected from the group of (i) leuco dye (ii) liquid crystal; (iii) wax; (iv) micro-encapsulated dye; (v) an ester; (vi) an alkane; (vii) an organic polymer; (viii) an inorganic material. In an additional embodiment, the thermochromic composition may be one of leuco dye, a micro-encapsulated leuco-dye, micro-encapsulated leuco pigments (basic components of thermochromic microcapsules include dye, developer, and solvent), an SCC Polymer, a water-based SCC polymer emulsion, liquid crystal, inorganic materials, a diacetylene, an alkane, a wax, an ester or combinations thereof.

In an embodiment, the memory thermochromic composition may be one of polyoxymethylenemelamine, maleate polymer, ODB-II, Green DCF, Behenic acid methylester, resin, color modifier, bisphenol A derivative, leuco dye, and UV absorber. In an embodiment, the memory thermochromic compositions may also be available in pigment powder form, water-based ink or slurry matrixes. For example, a water based slurry having the components: melamine formaldehyde resin, 3-diethylamino-6-methyl-7,2,4-xylidinofluoran, water, and aromatic ester may be used.

In an embodiment, the thermochromic composition provided in indicator region 106 is configured to provide multiple color states, visible to the human eye when the temperature exposure indicator is exposed to a range of thresholds. In an additional embodiment, the multiple thermochromic compositions are provided on the substrate 102, each composition has a respective low temperature threshold and respective low temperature color state and each composition has a respective high temperature threshold and a respective high temperature color state.

In an embodiment, the thermochromic composition located in the indicator region 106 is configured to have high temperature color state when it is heated above a high temperature threshold, and to remain in the high temperature color state until it is cooled below a low temperature threshold. Additionally, the thermochromic composition located in the indicator region 106 is configured to have a low temperature color state when it is cooled below the low temperature threshold and to maintain the low temperature threshold until it is heated above the high temperature threshold.

In an embodiment, as previously discussed, the provided memory thermochromic composition or memory thermochromic that is selected may exhibit hysteresis—the phenomenon in which the value of a physical property lags behind changes in the effect causing it—between the low temperature color state and the high temperature color state of this system, e.g., color density, although it will be appreciated that any color state change that is detectable may be employed. These compositions are often called memory thermochromics given they exhibit a large hysteresis curve.

FIG. 2 illustrates a perspective view of the temperature exposure indicator of FIG. 1 post customization and where a portion of the indicator region has been placed in the high temperature state, according to an example of the present disclosure. The indicator 100b may be place in a high temperature state through selective exposure to heat while being fed through a thermal printer. In some examples, the temperature threshold for activation may be from about 0° C. to 300° C., from about 100° C. to 300° C., and from about 200° C. to 300° C. Activation may be achieved by applying a high temperature for a very short interval. E.g., a few milliseconds. Typical thermal print heads have temperatures in the range from about 100° C. to 300° C., which may be tuned downward for select applications to from about 100° C. to 200° C. Any selected point on the media is typically exposed to the thermal print heads for a brief period of time, for example a few milliseconds. The printing region 104 of the substrate itself responds when it reaches a temperature of in a range from about 0° C. to 150° C., from about 0° C. to 50° C., from about 50° C. to 100° C., from about 100° C. to 150° C.

In an embodiment, the entire substrate 102 is accessible to the thermal printer and its printhead(s). In this example, everything outside indicator region 106 is print region 104 with no. Additionally, the entire print region 104 is being placed in the high temperature color state by through exposure to the thermal printer (e.g. changes from dark to light, revealing the star symbol).

In some examples, the thermal printer may include a processor, a memory coupled to the processor and a thermal print head, e.g., a conventional thermal printer with software modifications, described elsewhere in the present disclosure.

Referring to FIG. 2, indicator 100b has been activated by being passed through a thermal printer. The substrate 102 including the heat sensitive media of print region 104 have been exposed to a high temperature for a short interval thereby causing the heat sensitive media to darken. The heat sensitive media of print region 104 is configured so that the darkening is permanent with respect to subsequent cooling of the indicator 100b.

The substrate 102 of indicator 100b may also include an indicator region 106 where at least one memory thermochromic composition is provided on an indicator region 106 of the substrate 102. As illustrated, the memory thermochromic composition is visible to the human eye when it is provided on an indicator region 106 of the substrate 102, although it will be appreciated other approaches may be employed (e.g., invisible wavelengths, or the reverse, or just a color change). In an embodiment, a portion of the thermochromic composition 108 in the indicator region 106 is treated with heat from thermal print head and the treated portion becomes invisible. Conversely, other portions of the thermochromic composition in indicator region 106, namely 108, remains untreated and visible, as applied to the substrate 102 because it didn't receive heat treatment. In another embodiment, when, first the entire region is placed in the high temperature state, and then a portion of the indicator region 106 is exposed to the low temperature threshold using a cooling agent and a remaining portion 108 of the thermochromic composition is left in the high color temperature state. The treated region may be selected to provide a human readable indicia within the indicator region 106; the indicia may be formed by the visible material, or in a negative view by having only the background surrounding the indicia being visible, or by the use of contrasting colors or other approaches. The human readable indicia 108 may be any symbol or design chosen by the user of the indicator. For example, the human readable indicia 108 may be a symbol, shape, word, number, message, barcode or any other conceivable design.

Figure 3A:
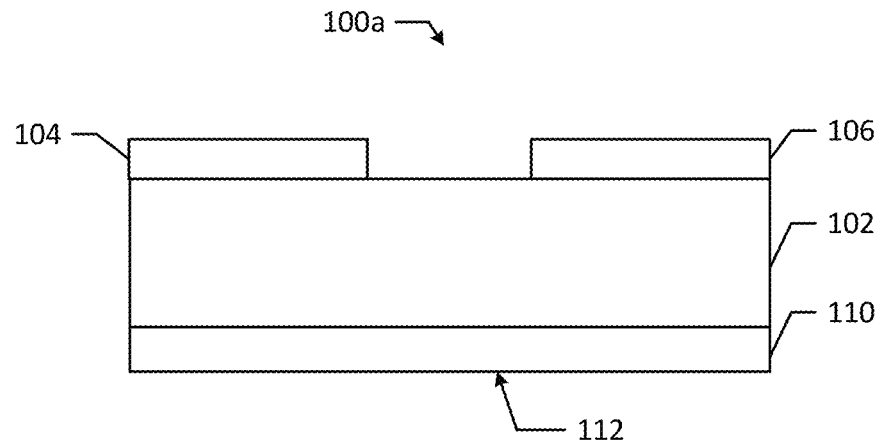
FIG. 3A illustrates a perspective view of the layers of a temperature exposure indicator where the print region and the indicator region are not overlapping, according to an example of the present disclosure.
Figure 3B:
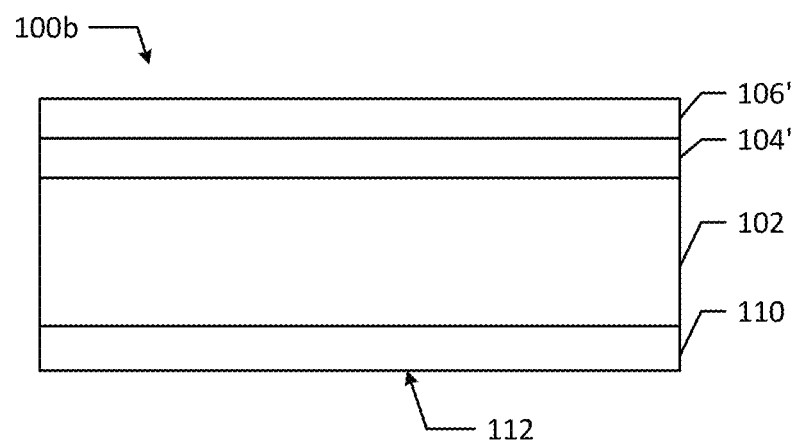
FIG. 3B illustrates a perspective view of the layers of a temperature exposure indicator where the print region and the indicator region are overlapping and occupy the entire face of the substrate, according to an example of the present disclosure.
Figure 3C:
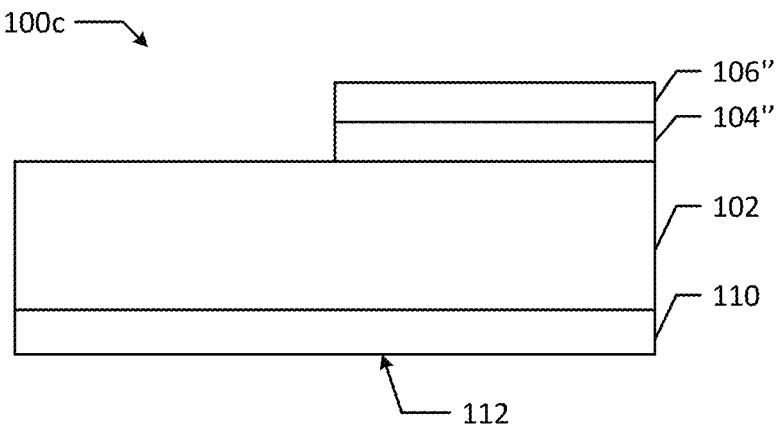
FIG. 3C illustrates a perspective view of the layers of a temperature exposure indicator where the print region and the indicator region are overlapping and do not occupy the entire face of the substrate, according to an example of the present disclosure.

In some embodiments, further illustrated in FIGS. 3A-3C, the indicator region 106 and the printing region 104 may be non-overlapping. In another embodiment, the indicator region 106 and the printing region 106 may be overlapping. In yet another embodiment, the printing region 104 occupies the entire surface of the substrate 102 and the indicator region 106 is contiguous with the print region 104.

FIG. 3A illustrates a perspective view of the layers a temperature exposure indicator, embodied in FIG. 1, where the print region and the indicator region are not overlapping according to an example of the present disclosure. Referring to FIG. 3A, in this embodiment, the print region 104 and the indicator region 106 are non-overlapping and not concentric. Here, print region 104 and the indicator region 106 occupy different surface areas of the substrate 102. In an embodiment, print region 104 and the indicator region 106 do not occupy the entire surface area of substrate 102. However, in an additional embodiment, print region 304 and the indicator region 306 may occupy the entirety of the surface area of substrate 102.

FIG. 3B illustrates a perspective view of the layers a temperature exposure indicator where the print region and the indicator region are overlapping and occupy the entire surface of the substrate, according to an example of the present disclosure. Referring to FIG. 3B, in this embodiment, the print region 104' and the indicator region 106' are overlapping and concentric. However here, print region 104' and the indicator region 106' do occupy the entire surface of the substrate 102.

FIG. 3C illustrates a perspective view of the layers a temperature exposure indicator similar but different than indicator 100 where the print region and the indicator region are overlapping and do not occupy the entire surface of the substrate according to an example of the present disclosure. Referring to FIG. 3C, indicator 100a includes a substrate 102 and, at the bottom most portion of substrate 102, optionally includes an adhesive layer 110. Adhesive 110 may be any release liner or an adhesive backing that allows the indicator 300a to be selectively attached to surfaces, e.g., as a label. Bottom most portion 112 may be affixed to any surface as needed, for example to containers for perishable goods, e.g., boxes or a vial for a biologic or vaccine.

In an embodiment, indicator 100c also includes a print region 104" and an indicator region 106. In an embodiment, the print region 104" and the indicator region 106" are overlapping and concentric. However, print region 104" and the indicator region 106" do not occupy the entire surface of the substrate 102 allowing the remaining surface area to be used for other, non-thermal printing, non-indicator purposes such as adding applied adhesive labels or the like. In an embodiment, additional indicators utilizing multiple thermochromic compositions may be placed on the available surface area of substrate 102.

Figure 4A:
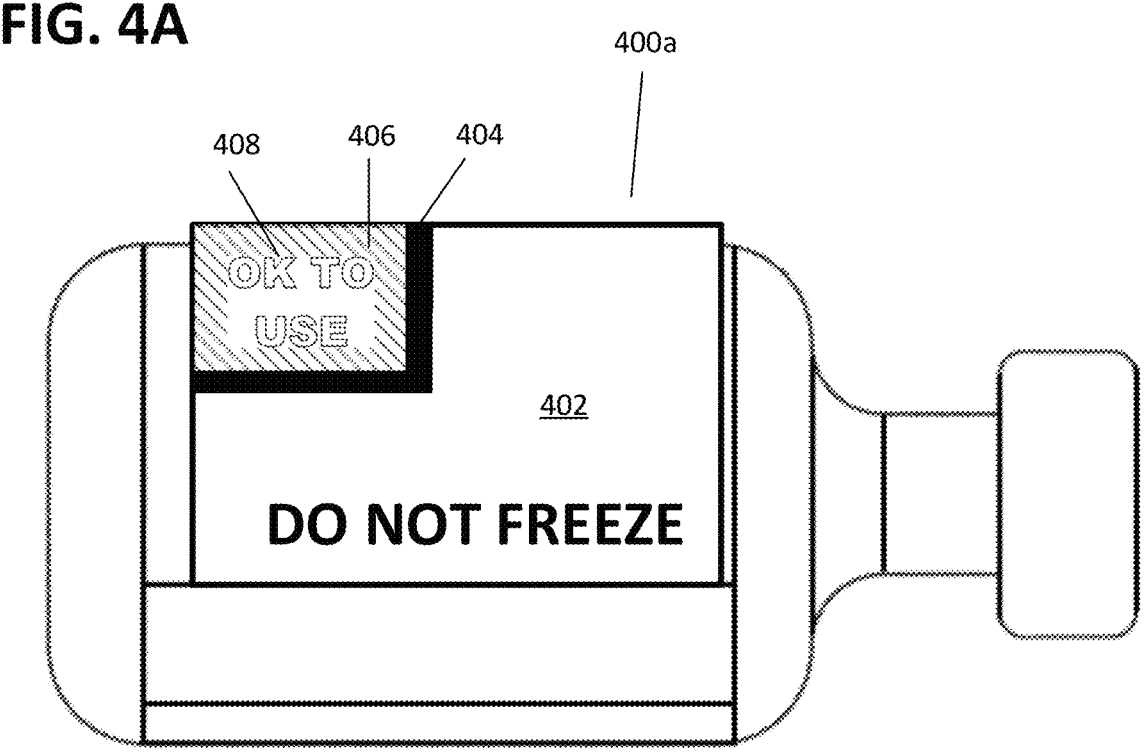
FIG. 4A illustrates an example descending temperature excursion indicator embodiment, adhered to a vial that has been kept above a low temperature threshold according to an example of the present disclosure.

FIG. 4A illustrates a perspective view of a customized descending temperature excursion indicator of FIG. 2, adhered to a vial, using a semi-irreversible temperature indicator composition. The indicator of FIG. 4A has been kept above a low temperature threshold according to an example of the present disclosure. A portion of 406 (in the illustration the background) has been placed in the high temperature state—where it has a visible color, and the other portion 406 (the lettering), has been placed in low temperature state where it is not colored. This may be accomplished by either putting the whole indicator in the high temperature state and then selectively cooling the lettering, or putting the whole indicator in the low temperature state, and then using a thermal printer or other selective heating to put all the background in the high temperature state. When the indicator transitions below the low temperature threshold, the indicia will disappear, because the remaining portion of the indicator will also transition to the low temperature state. Referring to FIG. 4A, indicator 400a is activated and indicia 408 within indicator region 406 is visible to the human eye. The portion of the thermochromic composition in the indicator region 406 that was treated with heat from thermal print head forms indicia 408. Print region 404 of the substrate 402 has darkened through exposure to a thermal printhead, the darkening being permanent with respect to subsequent cooling of the media. In an embodiment, a portion of the indicator region 406 has been exposed to the low temperature threshold using a cooling agent, placing that portion of the indicator region in a low temperature color state. While a remaining portion 408 of the thermochromic composition is left in the high color temperature state, thereby providing a human readable indicia 408 within the indicator region 406. In an embodiment, the cooling agent may be a freeze spray or any other agent capable of achieving temperatures below the low temperature threshold. In an embodiment, the low temperature threshold temperature is in a range from about −30° C. to about 20° C., from about −15° C. to about 10° C., from about −5° C. to about 5° C., from about 0° C. to about 15° C.

Figure 4B:
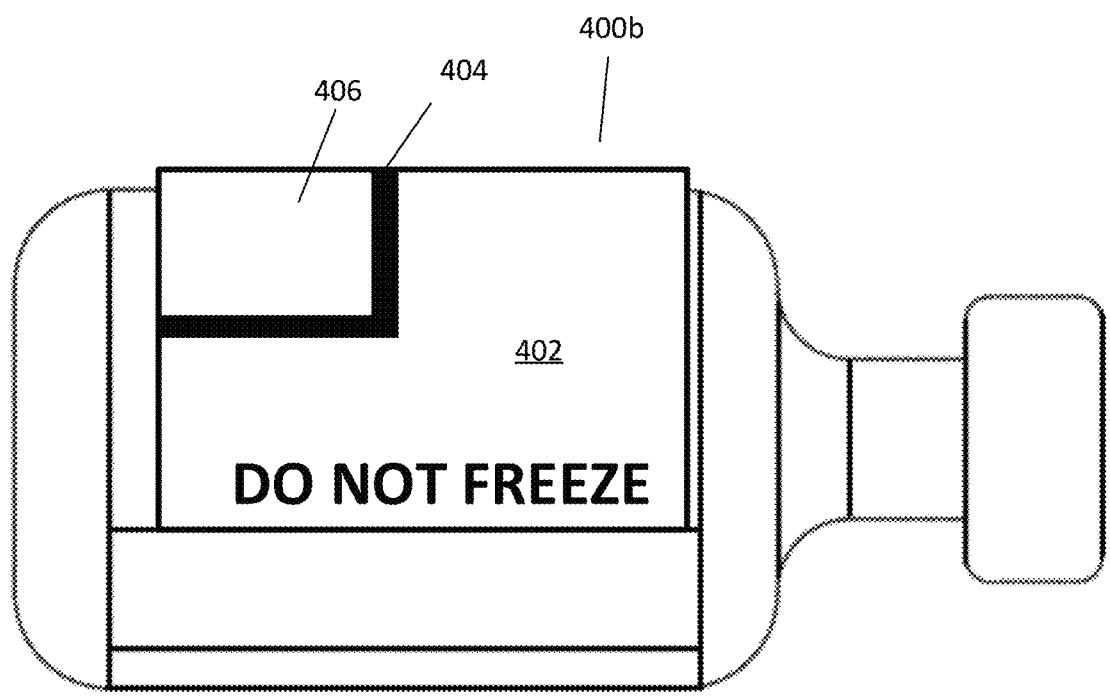
FIG. 4B illustrates the indicator of FIG. 4A, adhered to a vial, that has subsequently experienced a descending temperature excursion, according to an example of the present disclosure.

FIG. 4B illustrates the embodiment of FIG. 4A, adhered to a vial, that has subsequently experienced a reduced temperature excursion, according to an example of the present disclosure. Referring to FIG. 4B, indicator 400b has experienced a temperature excursion through being exposed to a temperature equal to or greater than a low temperature threshold. In an embodiment, the high temperature threshold temperature is in a range from about −30° C. to about 20° C., from about −15° C. to about 10° C., from about −5° C. to about 5° C., from about 0° C. to about 15° C. Therefore, because the thermochromic composition in the indicator region 406 transition from a high temperature color state to a low temperature color state, the indicia 408 of "OK TO USE" in located in indicator region 406 is no longer visible to the human eye. This provides indication that a reduced temperature excursion has occurred.

Figure 5A:
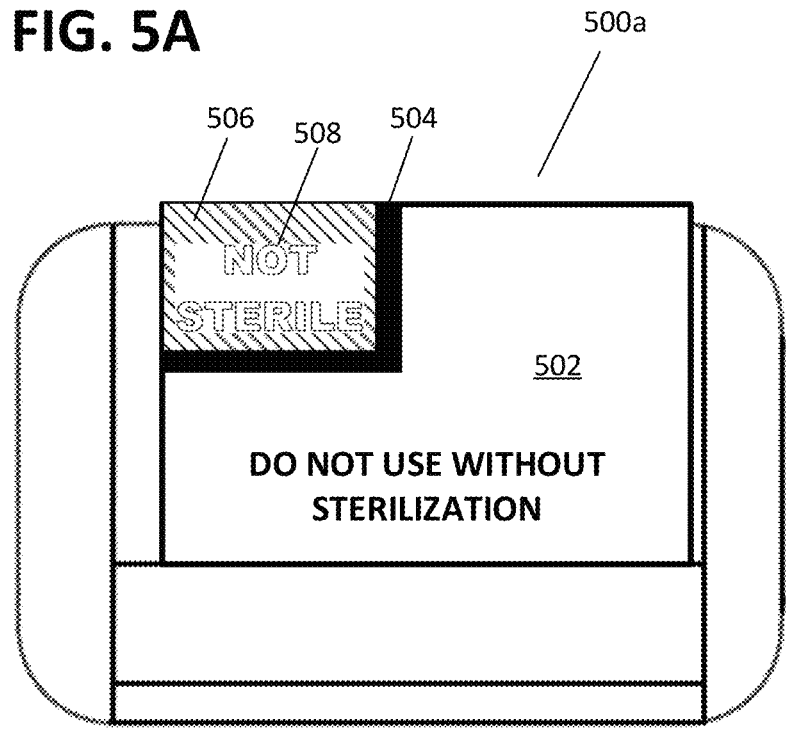
FIG. 5A illustrates an example ascending temperature excursion indicator, adhered to an object that has been kept below a high temperature threshold according to an example of the present disclosure.

FIG. 5A illustrates a perspective view of a customized ascending temperature excursion indicator of FIG. 2, adhered to an object, using a semi-irreversible temperature indicator composition. In an embodiment, the indicator of FIG. 5A may be used to indicate if an object has been exposed to a temperature greater than or equal to a sterilizing temperature according to an example of the present disclosure. Indicator 500a is activated and indicia 508 within indicator region 506 is visible to the human eye. The portion of the thermochromic composition in the indicator region 506 that was treated with heat from thermal print head forms indicia 508. In an embodiment, a portion of the indicator region 506 has been exposed to the low temperature threshold using a cooling agent, placing that portion of the indicator region in a low temperature color state. While a remaining portion 408 of the thermochromic composition is left in the high color temperature state, thereby providing a human readable indicia 508 within the indicator region 406. Because the thermochromic composition in indicator region 506 has not been exposed to a temperature equal to above a high temperature threshold, the thermochromic composition has remained in the low temperature color state and not transitioned to the high temperature color state thereby providing indicator visible to the human eye that the indicator has not been exposed to a temperature equal to above a high temperature threshold, e.g., the visible star pattern in the figure. In the illustrated embodiment, given indicia 508 is visible to the human eye, a user of the object, with proper training, appreciates that the object that the indicator 500a is adhered to has not been exposed to a high temperature (above a high temperature threshold) which is equal to a temperature necessary for sterilization to occur. (When the device has been heat sterilized the indicia would disappear). Therefore, the indicia 508 of "NOT STERILE' provides the user of the object indication that the object is not sterile and therefore not in good condition for use. It will be appreciated that multiple types of indicators and other information may also be provided on the label.

Figure 5B:
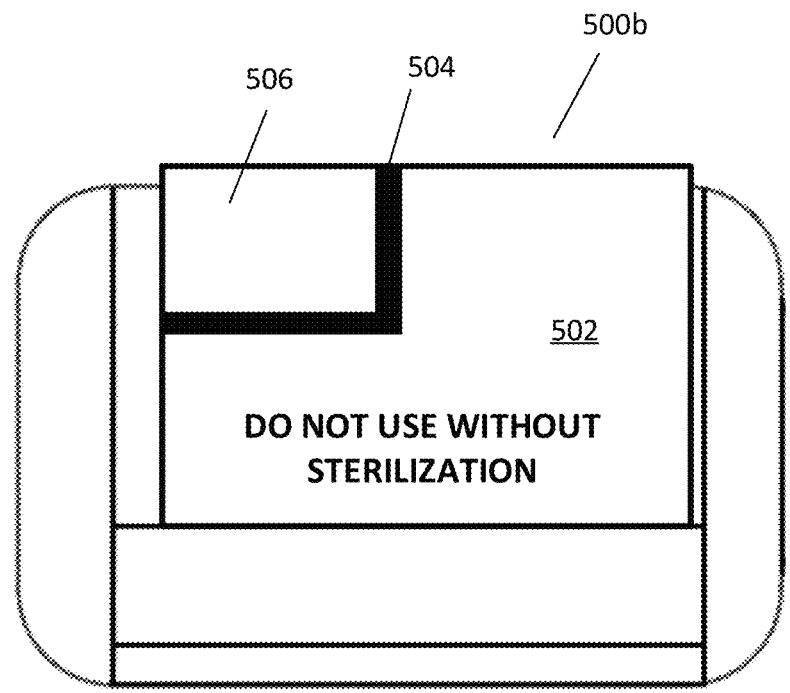
FIG. 5B illustrates the indicator FIG. 5A, adhered to an object, that has subsequently experienced an elevated temperature excursion, according to an example of the present disclosure.

FIG. 5B illustrates the embodiment of FIG. 5A, adhered to an object, that has subsequently experienced an elevated temperature excursion, according to an example of the present disclosure. In an embodiment, when indicator 500b has experienced a temperature excursion meaning, for a high temperature exposure indicator, that the indicator has been exposed to a temperature above a high temperature threshold. When this occurs, indicia 508 of FIG. 5A is no longer visible to the human eye in indicator region 506. In the illustrated embodiment, upon exposure to a temperature above the high temperature threshold temperature, the thermochromic composition located in indicator region 506 transitions from a visible low temperature color state to an invisible high temperature color state. In an embodiment, high temperature threshold temperature is greater than or equal to a temperature necessary for sterilization. In doing so, indicia 508 becomes no longer invisible to the human eye, thereby providing an indication that the indicator 500b adhered to the object has been exposed to a temperature equal to or above a high temperature threshold. In the illustrated embodiment, given indicia 508 is no longer visible to the human eye, a user of the object, with proper training, notices the indicia 508 is no longer visible appreciates that the object that the indicator 500a is adhered to has been exposed to a temperature equal to above a high temperature threshold and that the object is no longer acceptable for use.

Figure 6A:
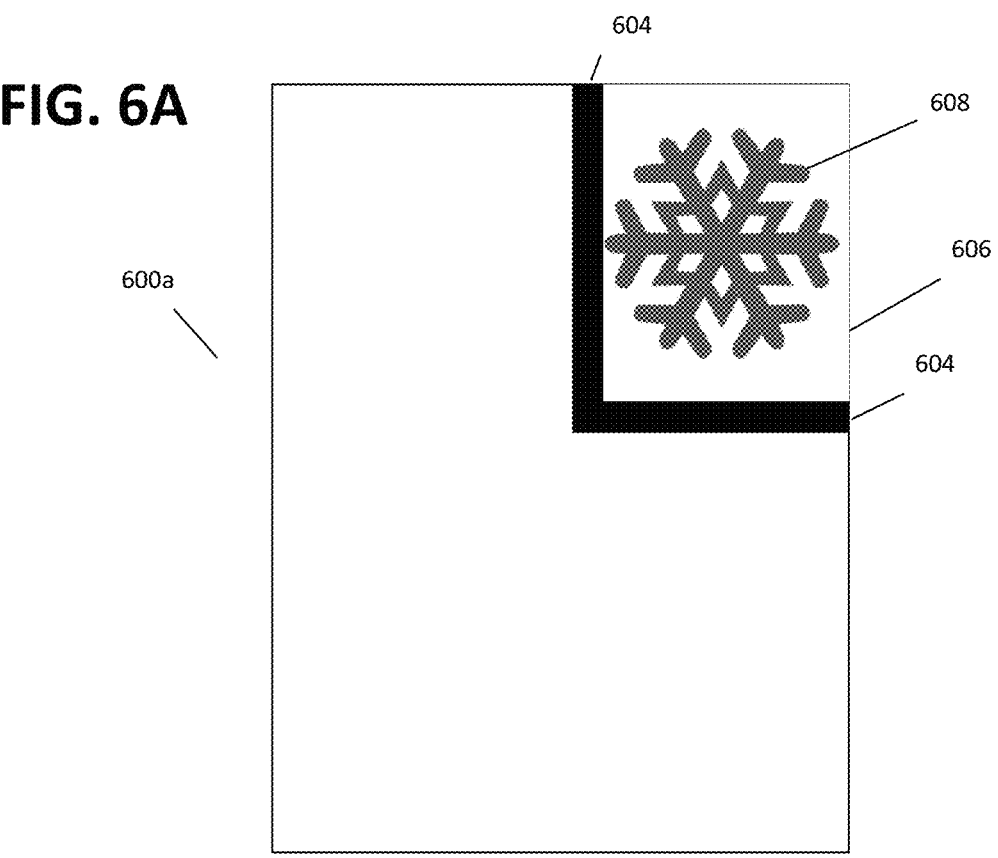
FIGS. 6A and 6B illustrate alternative example indicators utilizing different indicia, according to an example of the present disclosure.
Figure 6B:
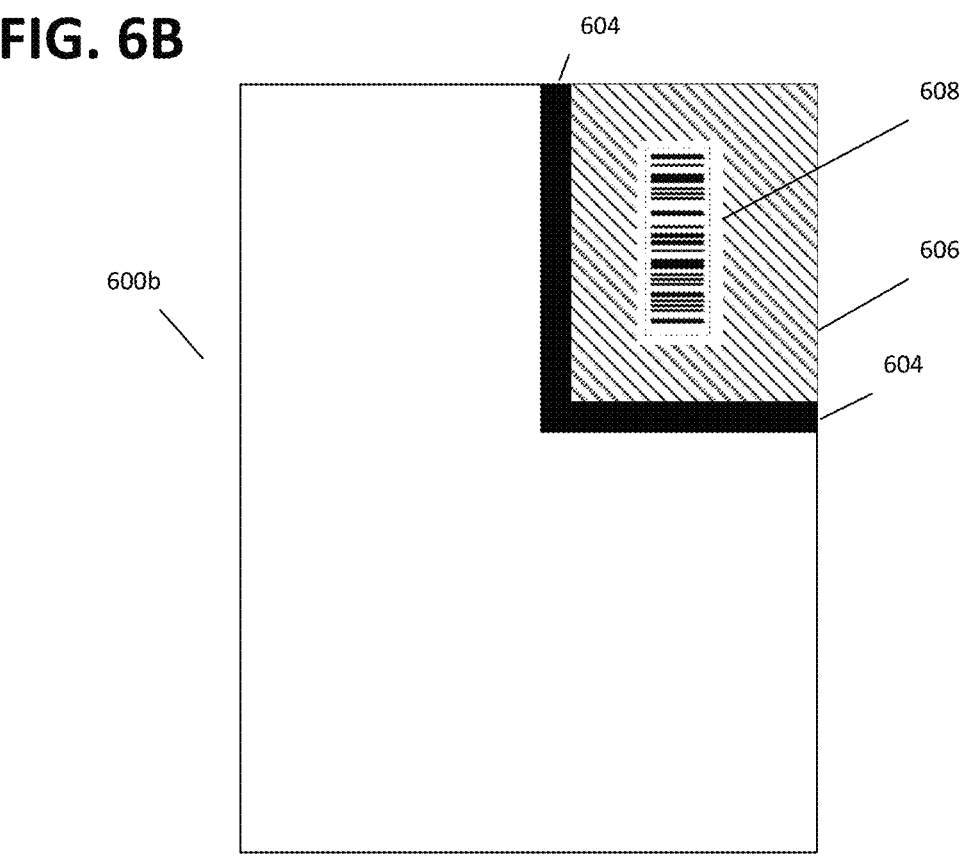

FIGS. 6A and 6B illustrate additional embodiments of FIG. 2 utilizing different indicia according to an example of the present disclosure.

In the illustrated embodiment, indicator 600a and 600b, the print region 604 and the indicator region 606 are overlapping and concentric. However, print region 604 and the indicator region 606 do not occupy the entire face of the substrate 602 allowing the remaining face area to be used for other purposes such as labeling. In an embodiment, the indicia 608 may be any symbol or design chosen, e.g., when the indicator is printed. For example, the indicia 608 may be a symbol, shape, word, number, message, barcode or any other conceivable design.

In an embodiment, still referring to FIG. 6A, a descending thaw indicator is disclosed. The heat from the thermal printhead causes the indicia region 606 to transition from a low temperature color state to high temperature state thereby becoming invisible to the human eye. However, the thermal printhead selectively did not treat the specific portion of indicia region 606, leaving indicia 608 in the low temperature state, thereby providing the visible snowflake indicia. When indicator 600*a* is exposed to a temperature equal to or above a high temperature threshold, indicia 608 will begin to transition from a low temperature color state to high temperature state thereby becoming invisible to the human eye. This provides indication to a trained user of the indicator that the products associated with the indicator 600*a* have experiences an elevated temperature excursion and may not be suitable for use.

In an embodiment, as illustrated in FIG. 6B, the indicator region 606 overlays at least a portion of a bar code symbol that is readable by an optical scanning device. The visual indication provided by the thermochromic composition located in indicator region 606 affects the appearance of the bar code and the changed appearance of the indicator region 606 may provide a different signal to the optical scanning device. Systems that combine color changing temperature exposure indicators, such as the one described in U.S. Pat. No. 10,318,781 to Prusik may be provided using this approach, thus allowing a bar code scanner or other device with similar capability to read and interpret the semi-irreversible temperature exposure indicator.

Additionally, in an embodiment, the bar code symbol is printed in the indicator region 606 and the indicator region 606 is placed in the high temperature state with the same printing operation.

Figure 7A:
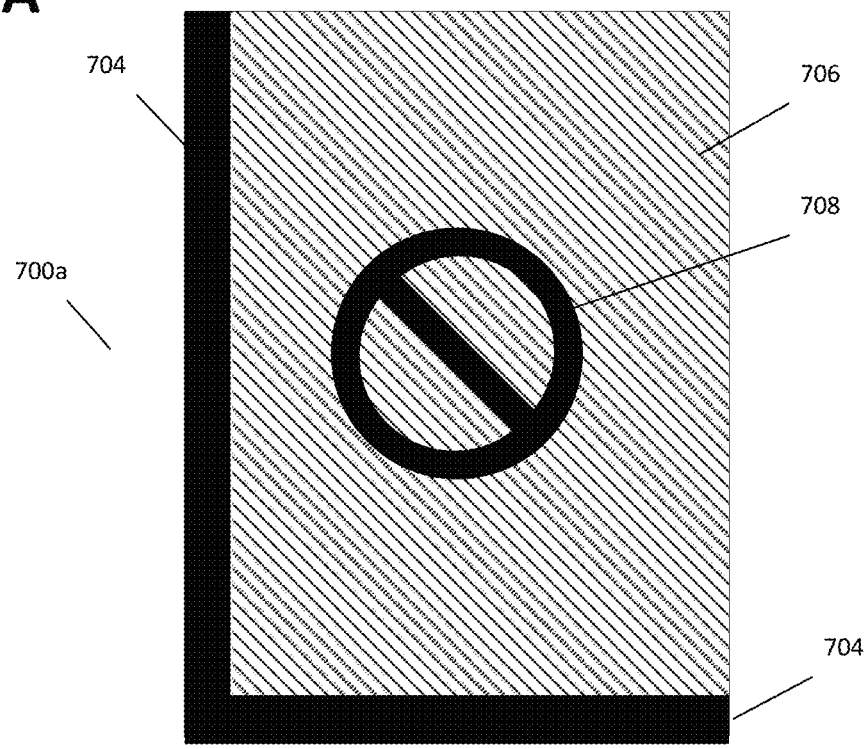
FIG. 7A illustrates an example indicator where the print region and the indicator region are overlapping and occupy the entire surface of the substrate, according to an example of the present disclosure.
Figure 7B:
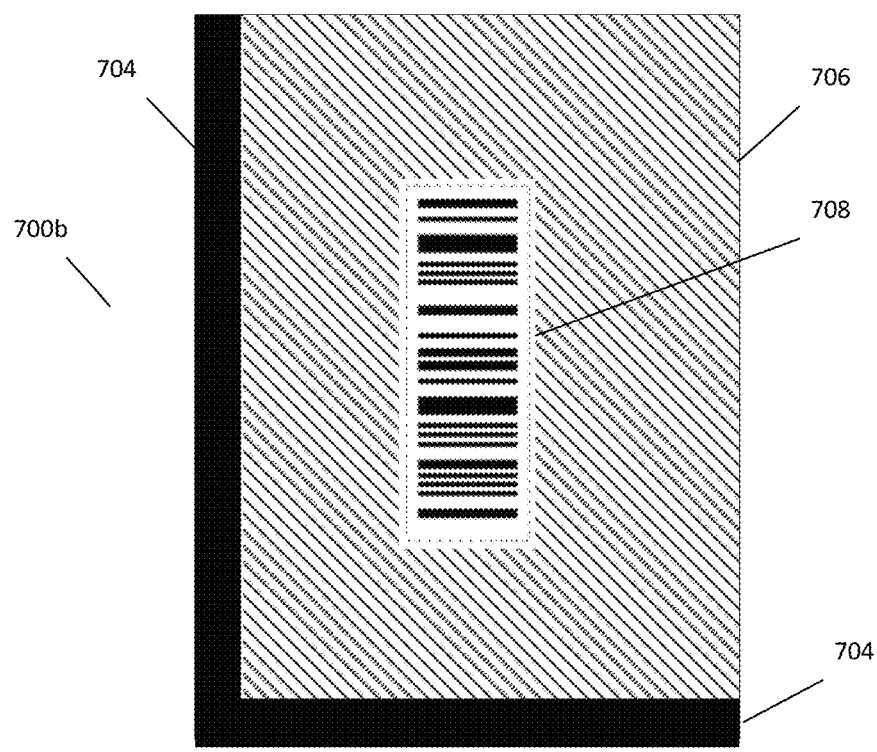
FIG. 7B illustrates another example indicator including a bar code where the print region and the indicator region are overlapping and occupy the entire surface of the substrate according to an example of the present disclosure.

FIGS. 7A and 7B illustrates the embodiments of FIGS. 6A and 6B where the print region and the indicator region are overlapping and occupy the entire surface of the substrate according to an example of the present disclosure.

FIG. 8 is a block diagram illustrating an example method of creating either an ascending or descending temperature indicator according to an example of the present disclosure. In block 802 a media is received that has a print region that darkens when it is heated by a thermal printhead. For example, the media may be a conventional thermal print medium. In block 804, an indicator region with a memory thermochromic composition may be provided on the substrate, either when it is received, or by applying the memory thermochromic material to the substrate the thermochromic composition is configured to have a high temperature color state when it is heated above a high temperature threshold and a low temperature color state when it is cooled below a low temperature threshold, as illustrated in block 802. Next, darkening of the print region by heating with a thermal print head occurs, the darkening is permanent with respect to subsequent cooling of the media, as illustrated in block 806. Optionally, before this occurs, the entire indicator region may be cooled to ensure it is in the low temperature color state. Optionally, the whole region may be treated to place it in either the high temperature color state or the low temperature color state depending on the intended application of the indicator, In an embodiment, only a portion of the indicia region may be treated to put the indicator in the a different temperature color state. Alternatively, the indicator may be received in a specific temperature color state and only portions of the indicator are treated.

Still referring to FIG. 8, at block 808, an indicia may be provided on the indicator region using the thermal printer, through treatment with heat from thermal print head. In on alternative the treated portion of the indicator region becomes invisible. Conversely, other portions of the thermochromic composition in indicator region 106 remain visible, because they did not receive heat treatment. If a descending temperature indicator is elected, placing a portion of the indicator region into the high temperature color state using the thermal printer occurs, as illustrated in block 808. In an embodiment, a portion of the indicator region remains in the color state it was received. Optionally, if an ascending temperature indicator is desired, placing a portion of the indicator region into the low temperature color state using a cooling agent occurs, In an embodiment, as illustrated by block 812, creating a descending temperature indicator includes leaving a second portion of the indicator region in the low temperature color state when the media is printed, so that the combination of the first and second portion of the thermochromic composition forms a human readable indicia indicating the indicator has not been exposed to a temperature below the low temperature threshold. Additionally, the indicia changes or disappears when the indicator is exposed to a temperature below the low temperature threshold, and is configured to indicate that the indicator has been exposed to a temperature below the low temperature threshold.

In an embodiment, the high temperature threshold temperature is in a range from about 5° C. to about 100° C., from about 20° C. to about 80° C., from about 30° C. to about 70° C., from about 40° C. to about 60° C. Additionally, in an embodiment, the low temperature threshold temperature is in a range from about −30° C. to about 20° C., from about −15° C. to about 10° C., from about −5° C. to about 5° C., from about 0° C. to about 20° C.

Optionally, creating an ascending temperature indicator includes leaving a second portion of the indicator region in the high temperature color state when the media is cooled, so that the combination of the first and second portion of the thermochromic composition forms a human readable indicia indicating the indicator has not been exposed to a temperature above the high temperature threshold. Additionally, the indicia changes or disappears when the indicator is exposed to a temperature above the high temperature threshold, and is configured to indicate that the indicator has been exposed to a temperature above the high temperature threshold.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention claimed is:

1. A temperature exposure indicator, comprising:
    a substrate, a printing region of the substrate forming a heat sensitive direct thermal print media that is configured to darken when it is heated by a direct thermal printer printhead, the darkening being permanent with respect to subsequent cooling of the media;

at least one memory thermochromic composition provided on an indicator region of the substrate, wherein the thermochromic composition is configured to have high temperature color state when it is heated above a high temperature threshold, and to remain in the high temperature color state until it is cooled below a low temperature threshold, wherein the thermochromic composition is configured to have a low temperature color state when it is cooled below the low temperature threshold and to maintain the low temperature color state until it is heated above the high temperature threshold.

2. The temperature exposure indicator of claim 1, wherein the darkened portion of the media maintains its dark appearance below the low temperature threshold.

3. The temperature exposure indicator of claim 1, wherein a portion of the indicator region is exposed to the high temperature threshold using a direct thermal print head placing the thermochromic composition in the portion of the indicator region in the high temperature color state, while a remaining portion of the thermochromic composition is left in the low temperature color state, thereby providing a human readable indicia within the indicator region.

4. The temperature exposure indicator of claim 3, wherein the high temperature color state of the thermochromic composition is invisible to the human eye, while the low temperature color state is visible or the high temperature color state of the thermochromic composition is visible to the human eye, while the low temperature color state is invisible.

5. The temperature exposure indicator of claim 1, wherein a portion of the indicator region is exposed to the low temperature threshold using a cooling agent, while a remaining portion of the thermochromic composition is left in the high color temperature state, thereby providing a human readable indicia within the indicator region.

6. The temperature exposure indicator of claim 5, wherein the high temperature state of the thermochromic composition is invisible to the human eye, while the low temperature state is visible or the high temperature color state of the thermochromic composition is visible to the human eye, while the low temperature color state is invisible.

7. The temperature exposure indicator of claim 1, wherein the visual characteristics of the memory thermochromic composition in the high temperature color state may vary based on temperature hysteresis of the composition.

8. The temperature exposure indicator of claim 1, wherein the visual characteristics of the memory thermochromic composition in the low temperature color state may vary based on temperature hysteresis of the composition.

9. The temperature exposure indicator of claim 1, wherein the indicator region and the printing region are non-overlapping.

10. The temperature exposure indicator of claim 1, wherein the indicator region and the printing region are overlapping.

11. The temperature exposure indicator of claim 10, wherein the printing region occupies the entire face of the substrate.

12. The temperature exposure indicator of claim 1, wherein the indicator region is contiguous.

13. The temperature exposure indicator of claim 1, wherein the high temperature threshold temperature is in a range from 5° C. to 100° C.

14. The temperature exposure indicator of claim 1, wherein the low temperature threshold temperature is in a range from −30° C. to 20° C.

15. The temperature exposure indicator of claim 1, wherein the thermochromic composition comprises at least one of (i) leuco dye (ii) liquid crystal; (iii) wax; (iv) micro-encapsulated dye; (v) an ester; (vi) an alkane; (vii) an organic polymer; (viii) an inorganic material.

16. The temperature exposure indicator of claim 1, wherein the substrate further comprises at least of one (i) paper; (ii) polyester; (iii) nylon; (iv) vinyl; (v) other synthetic polymers.

17. The temperature exposure indicator of claim 1, wherein the thermochromic composition is configured to provide multiple color states, visible to the human eye when the temperature exposure indicator is exposed to a range of threshold temperatures.

18. The temperature exposure indicator of claim 1, wherein multiple thermochromic compositions are provided on the substrate, each composition having a respective low temperature threshold and respective low temperature color state, or each composition have a respective high temperature threshold and a respective high temperature color state.

19. The temperature exposure indicator of claim 1, wherein the indicator region overlays at least a portion of a bar code symbol that is readable by an optical scanning device, wherein the visual indication provided by the thermochromic composition affects the appearance of the bar code, and wherein the changed appearance of the indicator region provides a different signal to the optical scanning device.

20. The temperature exposure indicator of claim 19, wherein the bar code symbol is printed and the indicator is placed in the high temperature color state with the same printing operation.

21. The temperature exposure indicator of claim 1, wherein the substrate includes printed information identifying the indicator region.

22. A method of creating a descending temperature indicator, the method comprising:

receiving a media having a direct thermal print region that darkens when it is heated by a direct thermal printer thermal printhead, the darkening being permanent with respect to subsequent cooling of the media, the media also having an indicator region with a memory thermochromic composition provided on the media, the thermochromic composition configured to have a high temperature color state when it is heated above a high temperature threshold, and to remain in the high temperature color state until it is cooled below a low temperature threshold, and a low temperature color state when it is cooled below a low temperature threshold and to maintain the low temperature color state until it is heated above the high temperature threshold, wherein the media is provided with the thermochromic composition in the low temperature color state, printing indicia on the media with a direct thermal printer in the print region;

placing a portion of the indicator region into the high temperature color state using the direct thermal printer.

23. The method of claim 22, further comprising leaving a second portion of the indicator region in the low temperature color state when the media is printed, so that the combination of the first and second portion of the thermochromic composition forms a human readable indicia indicating the indicator has not been exposed to a temperature below the low temperature threshold.

24. The method of claim 22, wherein the indicia changes or disappears when the indicator is exposed to a temperature below the low temperature threshold, and is configured to indicate that the indicator has been exposed to a temperature below the low temperature threshold.

25. The method of claim 22, wherein the high temperature threshold temperature is in a range from 5° C. to 100° C.

26. The method of claim 22, wherein the low temperature threshold temperature is in a range from −30° C. to 20° C.

27. The method of claim 22, wherein at least a portion of the indicator region is heated above the high temperature threshold thereby placing the indicator region in the high temperature state and contemporaneously applying the thermochromic composition to the thermochromic material region with the substrate being passed through a direct thermal printer.

28. A method of creating an ascending temperature indicator, the method comprising:

receiving a media having a direct thermal print region that darkens when it is heated by at direct thermal printer thermal printhead, the darkening being permanent with respect to subsequent cooling of the media, the media also having an indicator region with a memory thermochromic composition provided on the media, the thermochromic composition configured to have a low temperature color state when it is cooled below a low temperature threshold, and to remain in the low temperature color state until it is heated above a high temperature threshold, and a high temperature color state when it is heated above a high temperature threshold and to maintain the low temperature color state until it is cooled below the low temperature threshold, wherein the media is provided with the thermochromic composition in the high temperature color state, printing indicia on the media with a direct thermal printer in the print region; and placing a portion of the indicator region into the low temperature color state using a cooling agent to form a human readable indicia in the indicator region.

29. The method of claim 28, further comprising leaving a second portion of the indicator region in the high temperature color state when the media is cooled, so that the combination of the first and second portion of the thermochromic composition forms a human readable indicia indicating the indicator has not been exposed to a temperature above the high temperature threshold.

30. The method of claim 28, wherein the indicia changes or disappears when the indicator is exposed to a temperature above the high temperature threshold, and is configured to indicate that the indicator has been exposed to a temperature above the high temperature threshold.

31. The method of claim 28, wherein the high temperature threshold temperature is in a range from 5° C. to 100° C.

32. The method of claim 28, wherein the low temperature threshold temperature is in a range from −30° C. to 20° C.

* * * * *